(12) United States Patent
Duan et al.

(10) Patent No.: US 10,601,911 B2
(45) Date of Patent: Mar. 24, 2020

(54) PARTITIONING OF A BLOCKCHAIN LEDGER

(71) Applicant: International Business Machines Corporation, Armonk, NY (US)

(72) Inventors: Tao Duan, Beijing (CN); Hai Ji, Beijing (CN); Zi Jian Ji, Beijing (CN); Yuan Yuan Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 173 days.

(21) Appl. No.: 15/814,609

(22) Filed: Nov. 16, 2017

(65) Prior Publication Data
US 2019/0149600 A1   May 16, 2019

(51) Int. Cl.
| H04L 29/08 | (2006.01) |
| H04L 9/06 | (2006.01) |
| G06F 21/62 | (2013.01) |
| G06F 16/23 | (2019.01) |
| G06F 21/64 | (2013.01) |

(52) U.S. Cl.
CPC ...... *H04L 67/1042* (2013.01); *G06F 16/2379* (2019.01); *G06F 21/62* (2013.01); *G06F 21/64* (2013.01); *H04L 9/0637* (2013.01); H04L 2209/56 (2013.01)

(58) Field of Classification Search
CPC .... H04L 67/1042; H04L 9/0637; G06F 21/62
USPC .................................................. 713/150–155
See application file for complete search history.

(56) References Cited

U.S. PATENT DOCUMENTS

| 2016/0283920 | A1* | 9/2016 | Fisher | G06Q 20/02 |
| 2017/0132625 | A1 | 5/2017 | Kennedy et al. | |
| 2017/0132626 | A1* | 5/2017 | Kennedy | G06Q 20/065 |
| 2018/0019867 | A1* | 1/2018 | Davis | H04L 9/0637 |
| 2018/0096175 | A1* | 4/2018 | Schmeling | B29C 64/10 |
| 2018/0113752 | A1* | 4/2018 | Derbakova | G06Q 40/025 |
| 2018/0114220 | A1* | 4/2018 | Ekberg | G06Q 20/3829 |
| 2018/0337769 | A1* | 11/2018 | Gleichauf | H04L 9/3239 |
| 2018/0341496 | A1* | 11/2018 | Huntley | G06F 9/441 |
| 2019/0058696 | A1* | 2/2019 | Bowman | H04L 63/0428 |
| 2019/0080392 | A1* | 3/2019 | Youb | G06F 21/64 |

FOREIGN PATENT DOCUMENTS

| GB | 2535237 A | 8/2016 |
| WO | 201646820 A1 | 3/2016 |

OTHER PUBLICATIONS

S. King, and S. Nadal, PPCoin: Peer-to-Peer Crypto-Currency with Proof-of-Stake, Aug. 19, 201. Retrieved from internet: http://peerco.in/assets/paper/peercoin-paper.pdf.
Blockchain—A forward step to secure transaction. Retrieved from internet using: http://blog.ifourtechnolab.com/post/2016/10/04/blockchain-a-forward-step-to-secure-transaction.
Blockchain—Wikipedia,, The Free Encyclopedia, date of last revision: Jun. 28, 2017 09:45 UTC, page version ID: 787913116 Retrieved from Internet using: https://en.wikipedia.org/w/index.php?title=Blockchain&oldid=787913116.

* cited by examiner

*Primary Examiner* — Lynn D Feild
*Assistant Examiner* — Viral S Lakhia

(57) ABSTRACT

An example operation may include one or more of identifying partitions associated with a blockchain, identifying a new transaction to be committed to the blockchain, determining a partition code assigned to the new transaction, and committing the new transaction to one of the partitions associated with the partition code.

18 Claims, 6 Drawing Sheets

PARTITIONING OF A BLOCKCHAIN LEDGER

TECHNICAL FIELD

This application generally relates to a blockchain, and more particularly, partitioning of a blockchain ledger.

BACKGROUND

A blockchain may be used as a public ledger to store any type of information. Although, primarily used for financial transactions, a blockchain can store any type of information including assets (i.e., products, packages, services, status, etc.). A decentralized scheme transfers authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary.

A blockchain is a distributed database that maintains a continuously-growing list of records in the blockchain blocks, which are secured from tampering and revision due to their immutable properties. Each block contains a timestamp and a link to a previous block. A blockchain can be used to hold, track, transfer and verify any information. Because a blockchain is a distributed system, before adding a transaction to a blockchain ledger, all peers need to reach a consensus status, however, the process of consensus requires a certain amount of time. The more peers added to a blockchain network, the longer the time that is spent to reach a consensus status. In general, a blockchain cannot process high frequency transactions.

SUMMARY

One example embodiment may provide a method that includes one or more of identifying a plurality of partitions associated with a blockchain, identifying a new transaction to be committed to the blockchain, determining a partition code assigned to the new transaction, and committing the new transaction to one of the plurality of partitions associated with the partition code.

Another example embodiment may include an apparatus that includes a processor configured to perform one or more of identify a plurality of partitions associated with a blockchain, identify a new transaction to be committed to the blockchain, determine a partition code assigned to the new transaction, and a transmitter configured to transmit the new transaction to one of the plurality of partitions associated with the partition code.

Still another example embodiment may include a non-transitory computer readable storage medium configured to store instructions that when executed cause a processor to perform one or more of identifying a plurality of partitions associated with a blockchain, identifying a new transaction to be committed to the blockchain, determining a partition code assigned to the new transaction, and committing the new transaction to one of the plurality of partitions associated with the partition code.

DETAILED DESCRIPTION

Figure 1:
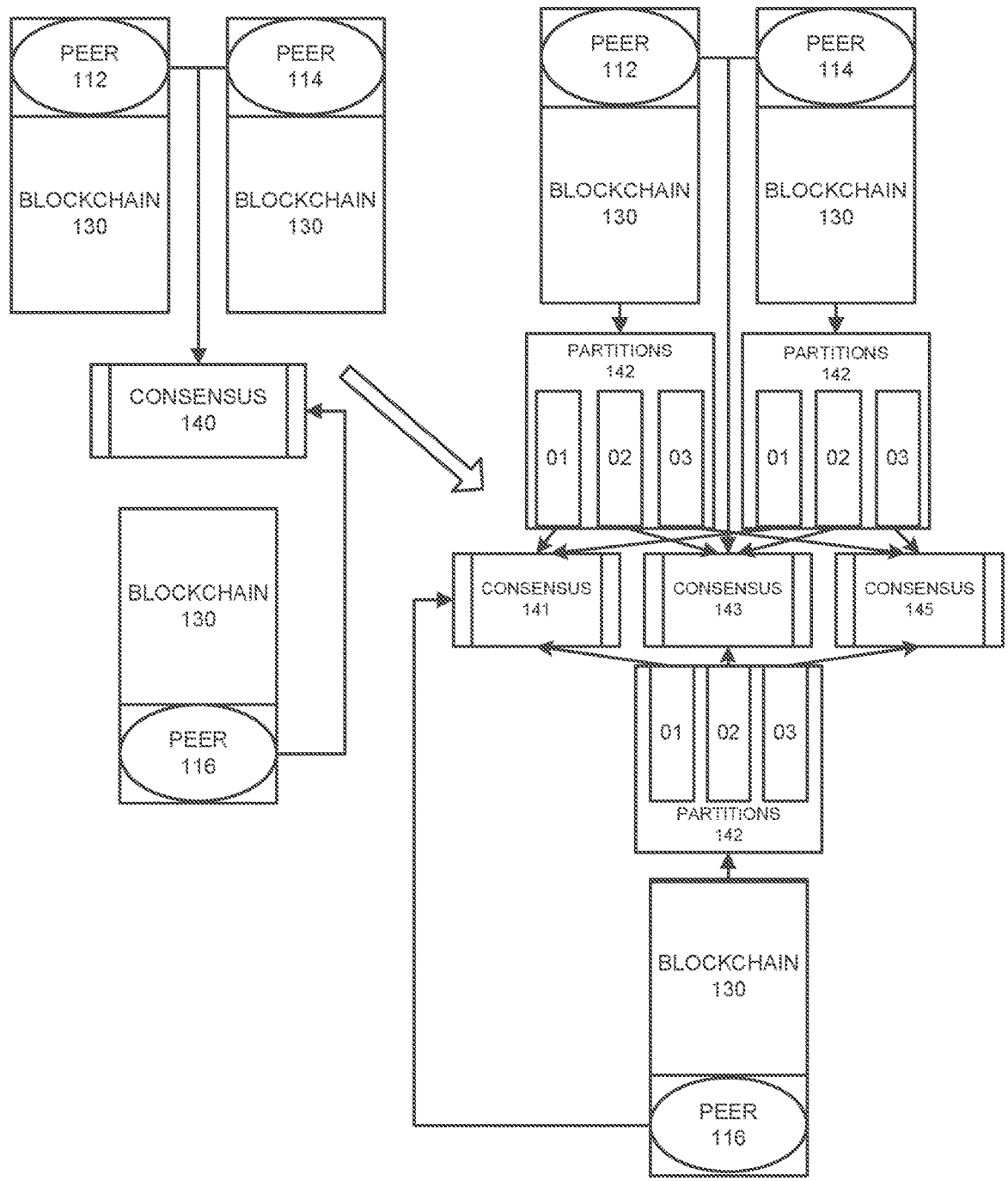
FIG. 1 illustrates a logic diagram of a partitioned blockchain, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

The instant application in one embodiment relates to partitioning a blockchain, and in another embodiment relates to determining a number of partitions to use to provide virtual separation of blockchain information into separate partitions of the blockchain ledger.

Example embodiments provide a method to enhance the scalability of a blockchain, to increase the capacity of transaction processing. In one example, the blockchain ledger may be divided into multiple partitions. Every transaction received after a partitioning occurs may be dispatched to one specific partition based on a partition code assigned to that transaction. Also, the partition may be assigned based on the content of the transaction, identifiers associated with transaction parties, such as any one or more of the transaction parties. Every partition needs to reach a consensus status with a same partition on other peers and there is no need to include peers or other resources associated with the other partitions. For example, if a blockchain ledger is divided into five partitions, the capacity to process transactions could be five times greater than before. If the blockchain ledger is not partitioned, it will process transactions one-by-one or one transaction at a time, but if divided into five partitions, the blockchain can processes five transactions at the same time, with each partition processing one transaction at a time, which enables parallel processing operations (i.e., processing multiple transactions at the same time) or one transaction per partition at any given time, and thus the capacity in this example could be as large as five times the normal capacity.

In operation, there may be a special entry in every transaction called a partition code. The partition code may be used to define a partition rule, where the definition is a portion of script code. For example, in JavaScript, the code may be:

```
partition(code) {
    var n = code % 5
    switch(n) {
        case 0: dispatch("partition00"); break;
        case 1: dispatch("partition01"); break;
        case 2: dispatch("partition02"); break;
        case 3: dispatch("partition03"); break;
        case 4: dispatch("partition04"); break;
        default: dispatch("partition00");
    }
}.
```

When a blockchain service application/module receives a partition definition, it will record the definition into the blockchain ledger, and verify and build the definition into a partition switcher. A ledger partition may be based on this definition, the creation will be executed on every peer in the blockchain network. Every time, a new transaction arrives at a peer for approval, the partition switcher application/module extracts the partition code and decides which partition to assign the transaction, and then dispatches it to that partition to process. The switcher is part of the peers, and each peer has its own switcher module. In general, there are many pieces of information stored in one transaction, and may include several sections/fields with one particular section storing the partition code. If a blockchain is partitioned, every peer is a partition peer, all peers will have the same structure.

FIG. 1 illustrates a logic diagram of a partitioned blockchain, according to example embodiments. Referring to FIG. 1, the configuration 100 demonstrates a set of peers 112, 114, 116, etc., each with their own local ledger 130, which should be the same for each, reaching consensus 140 to partition the blockchain ledger into separate partitions.

In the resulting model, the partitions 142 illustrate three separate partitions of the blockchains 130. The actual partitions may vary in number and are directly proportional to the size of the blockchain ledger. Now, when new transactions arrive and seek consensus, the peers may determine which partition to assign the transactions accordingly based on an assignment code, random selection procedure and/or another selection procedure. In this example, the consensus processes 141, 143 and 145, are being conducted simultaneously for each partition 1, 2 and 3. In this configuration, the speed of consensus may be up to three times faster than the conventional approach.

Figure 2:
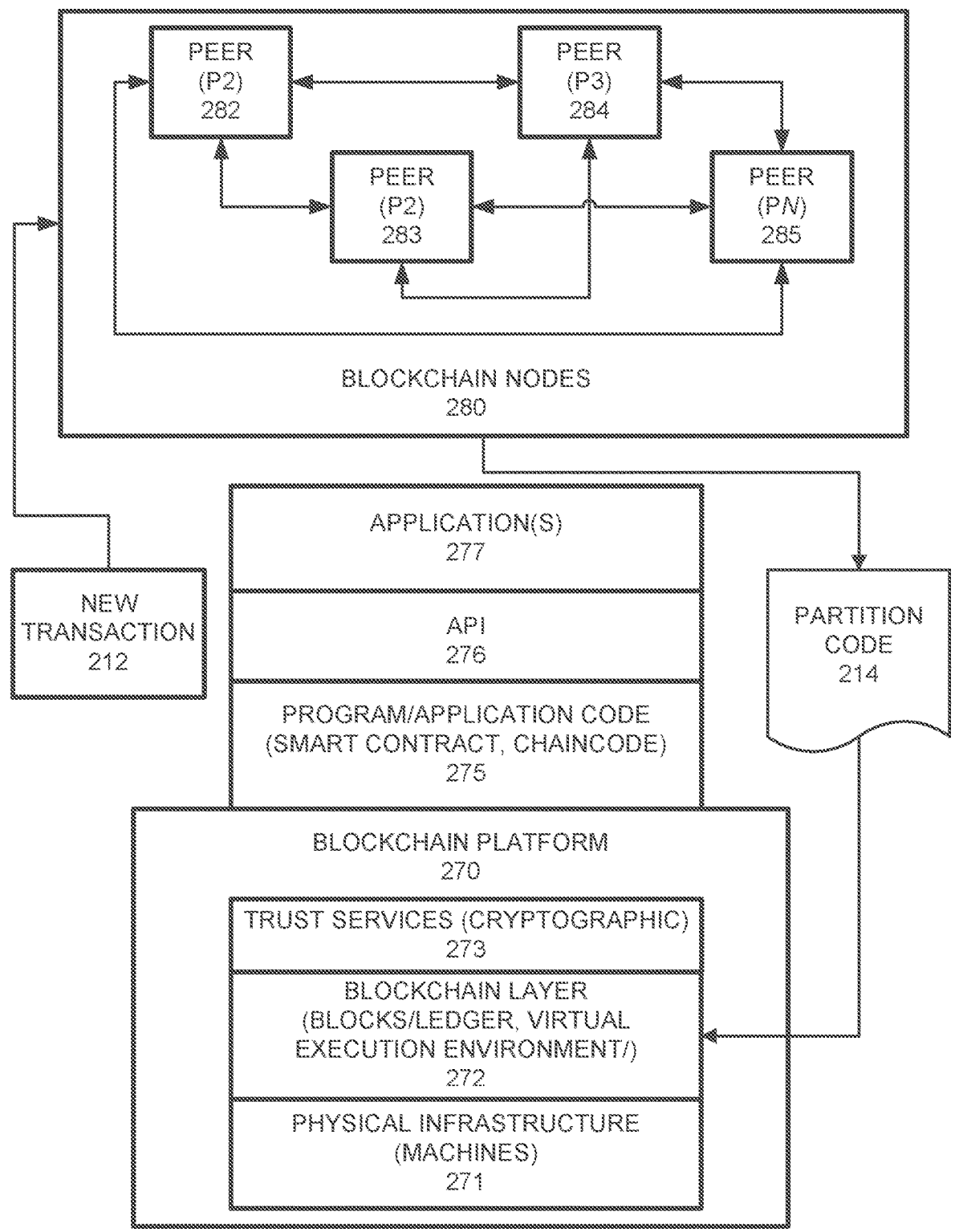
FIG. 2 illustrates an example blockchain configuration for performing a transaction assignment to a partition on the blockchain, according to example embodiments.

FIG. 2 illustrates an example blockchain configuration for performing transaction assignment to a partitioned ledger, according to example embodiments. Referring to FIG. 2, the blockchain system 200 may include certain common blockchain elements, such as a group of blockchain nodes 280, which may be assigned peer blockchain nodes 'peer nodes' 282-285, which participate in the blockchain transaction addition and validation process (consensus). Any of the blockchain peer nodes 280 may initiate new transactions and seek to write to the blockchain immutable ledger 272, a copy of which is stored on the underpinning physical infrastructure 271 of the blockchain 270. In this configuration, the customized blockchain configuration may include one or applications 277 which are linked to APIs 276 to access and execute stored program/application code (e.g., chain code and/or smart contracts) 275, which are created according to the customized configuration sought by the participants and can maintain their own state, control its own assets, and receive external information. This code can be deployed as a transaction and installed, via appending to the distributed ledger, on all blockchain peer nodes.

The blockchain platform 270 includes the various layers of blockchain data, services (e.g., cryptographic trust services, virtual execution environment), and underpinning physical computer infrastructure necessary to receive and store new transactions and provide access to auditors, which are seeking to access data entries. The blockchain layer 272 exposes an interface that provides access to the virtual execution environment necessary to process the program code and engage the physical platform 271. Cryptographic trust services 273 are used to verify transactions and maintain private information.

The blockchain configuration of FIG. 2 may process and execute program/application code 275 by way of the interfaces exposed, and the services provided, by blockchain platform 270. The code may control blockchain assets, for example, it can store and transfer data, and may be executed by the blockchain, for example, in the form of a smart contract and associated chain code with conditions or other code elements subject to its execution. The smart contracts 275 may be created to execute reminders, updates, and/or other notifications subject to the changes, updates, etc. The smart contracts can themselves be used to identify rules associated with authorization and access requirements and usage. In one example, a new transaction 212 may be identified by the peer nodes 280. The nodes may identify updated transactions with partition information and then at some point reach consensus and permit the block/transaction to be created/committed to the blockchain ledger 272 provided that the correct partition is identified. Also, the partition code 214 may be extracted and used to access and identify blockchain partitions to update the ledger at the correct partition location.

Figure 3:
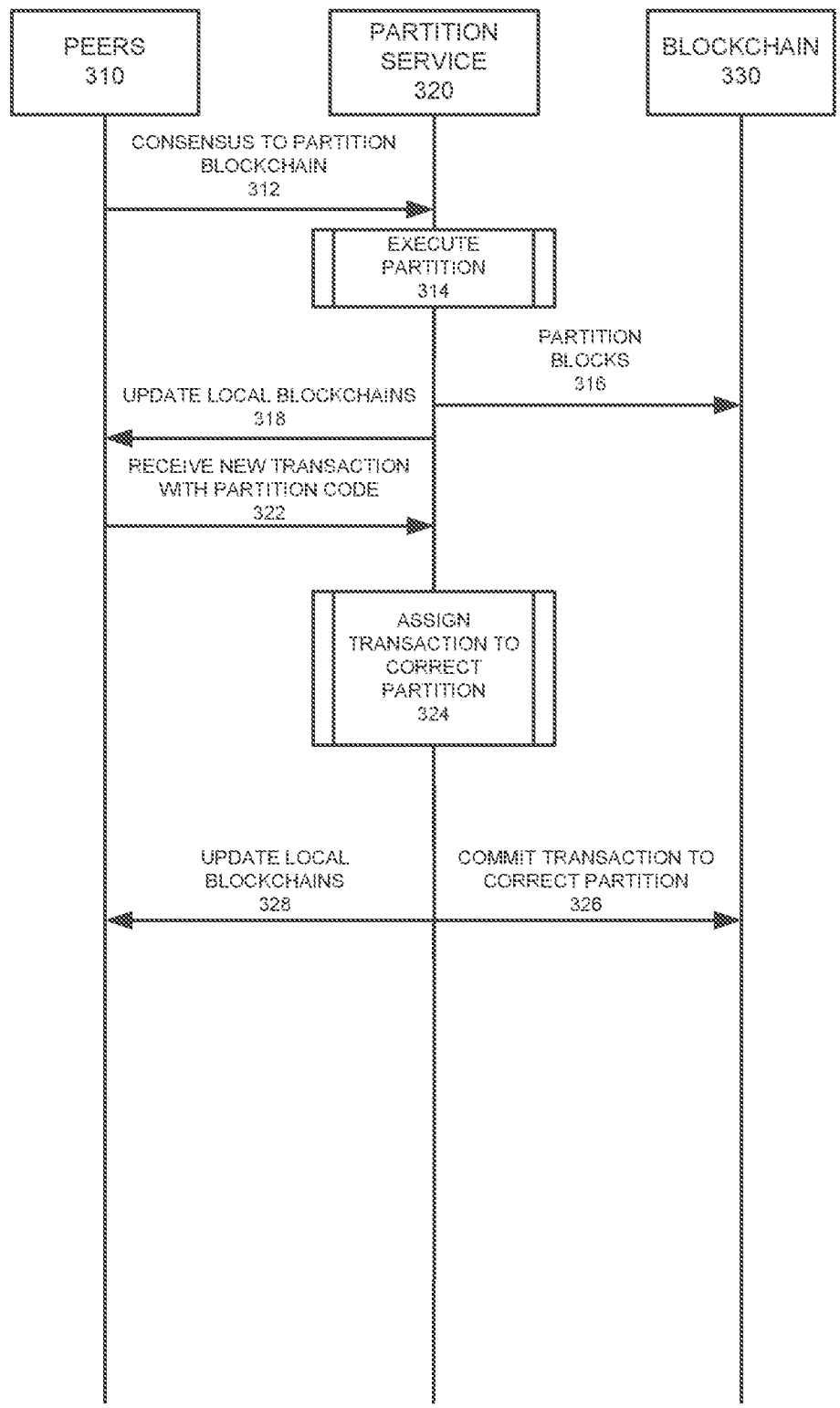
FIG. 3 illustrates a system messaging diagram for processing partition creation and transaction assignment, according to example embodiments.

FIG. 3 illustrates a system messaging diagram for processing partition creation and transaction assignment, according to example embodiments. Referring to FIG. 3, in this configuration 300, the peers 310 may agree to partition the blockchain 330 by reaching consensus 312 and executing the partition 314 according to the terms of the partition agreement. The partition blocks 316 may represent the sections of the blockchain 330 which are identified, designated and also replicated in an update 318 to the peers 310. A new transaction with a partition code 322 may be received subsequent to the partitioning and the transaction is then assigned to the correct partition 324 via the partition service 320. The updates to the ledger are shared 326 with any master blockchain copies and with the local peers via their own blockchain copies 328.

Figure 4A:
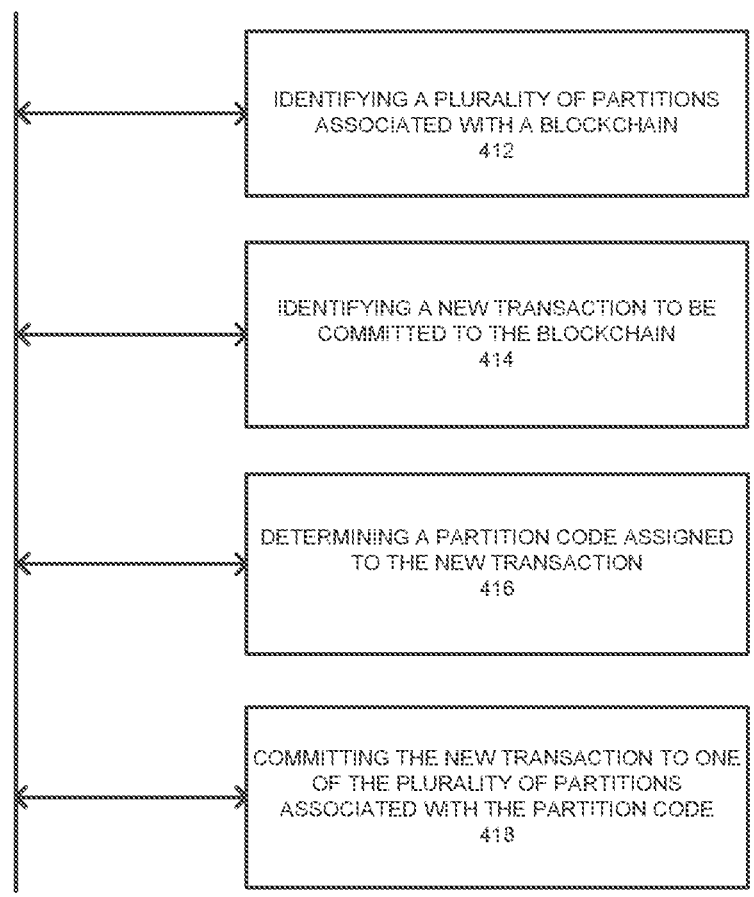
FIG. 4A illustrates a flow diagram of an example method of committing a transaction to a blockchain partition, according to example embodiments.

FIG. 4A illustrates a flow diagram of an example method of committing a transaction to a blockchain partition, according to example embodiments. Referring to FIG. 4A, the method 400 may provide identifying a plurality of partitions associated with a blockchain 412, identifying a new transaction to be committed to the blockchain 414, determining a partition code assigned to the new transaction 416, and committing the new transaction to one of the plurality of partitions associated with the partition code 418. The partition code assigned to the new transaction is identified based on a partition code script which defines the partition definition used to create the plurality of partitions. The method may also include receiving the partition definition, and storing the partition definition in the blockchain, and creating the plurality of partitions based on the partition definition. The method may further include broadcasting the plurality of partitions to a plurality of peer nodes, receiving the new transaction at one or more of the plurality of peer nodes, extracting the partition code from the new transaction via a partition switcher module, and forwarding the new transaction to the assigned partition for commitment in the blockchain.

Figure 4B:
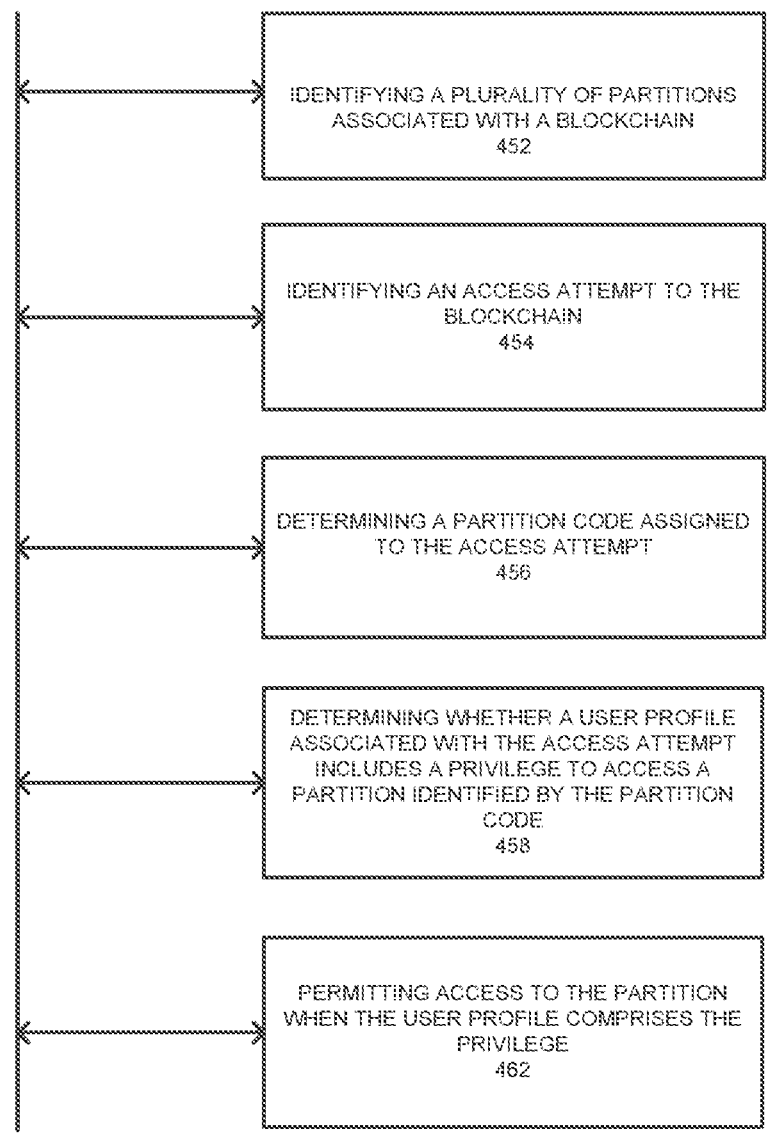
FIG. 4B illustrates another flow diagram of an example method of applying security to a blockchain partition, according to example embodiments.

FIG. 4B illustrates another flow diagram of an example method of applying security to a blockchain partition, according to example embodiments. The method 450 may include identifying a plurality of partitions associated with a blockchain 452, identifying an access attempt to the blockchain 454, determining a partition code assigned to the access attempt 456, determining whether a user profile associated with the access attempt includes a privilege to access a partition identified by the partition code 458, and permitting access to the partition when the user profile comprises the privilege 462.

In addition to partitioning the blockchain and assigning transactions to the partitions, the various partitions can be outfitted with varying security levels, varying security assignments and ones that require access to separate keys and/or credentials to access the individual partitions. When a party or user profile linked to a requesting entity has access rights or a privilege to access a particular partition, then access attempts may be granted accordingly once a check is performed for the required privileges. The privilege information may be a key, a code, or other stored credential required to be identifier prior to providing access rights.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example computer system architecture 500, which may represent or be integrated in any of the above-described components, etc.

Figure 5:
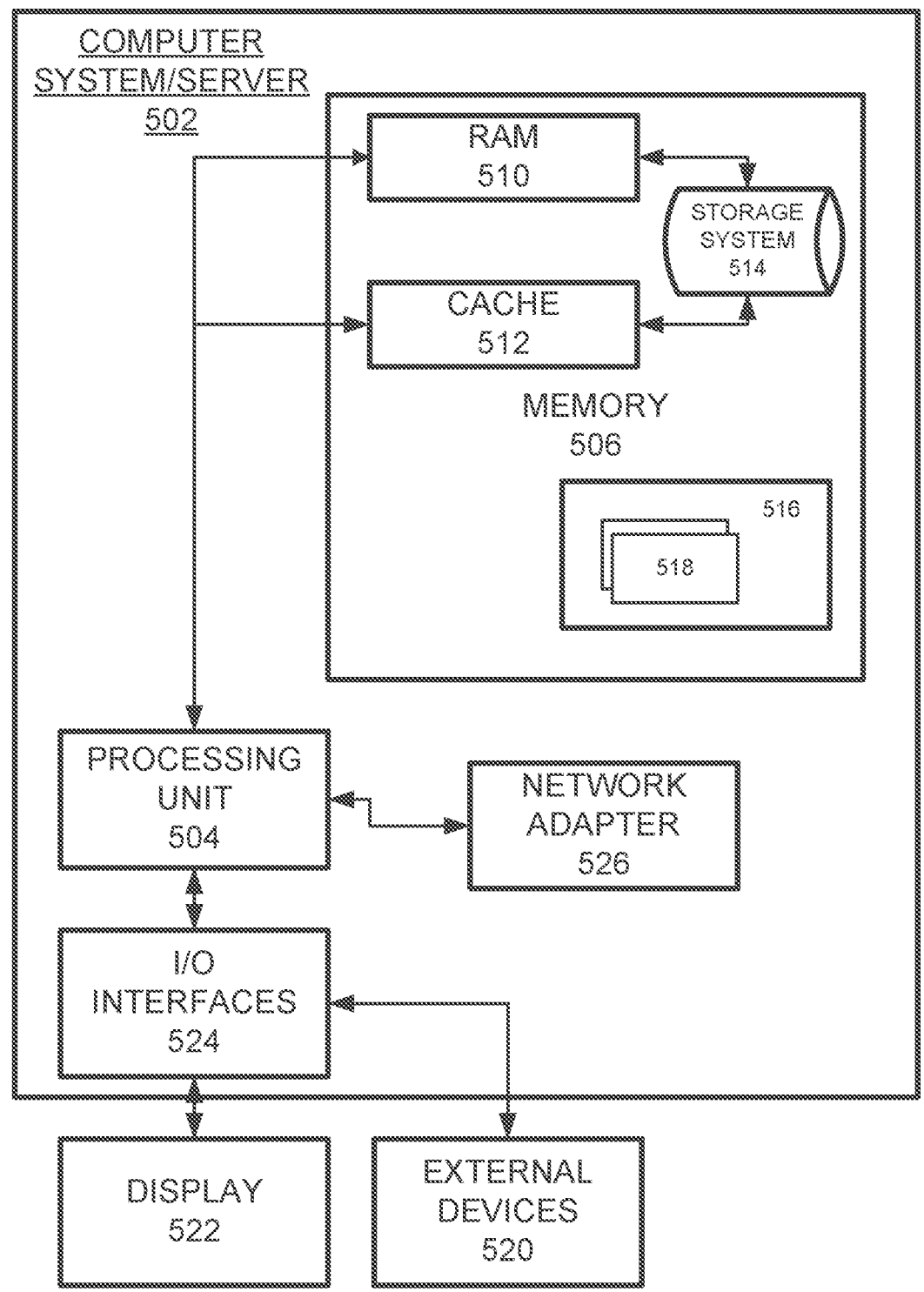
FIG. 5 illustrates an example computer system/server configured to support one or more of the example embodiments.

FIG. 5 is not intended to suggest any limitation as to the scope of use or functionality of embodiments of the application described herein. Regardless, the computing node 500 is capable of being implemented and/or performing any of the functionality set forth hereinabove.

In computing node 500 there is a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 502 in cloud computing node 500 is shown in the form of a general-purpose computing device. The components of computer system/server 502 may include, but are not limited to, one or more processors or processing units 504, a system memory 506, and a bus that couples various system components including system memory 506 to processor 504.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media. System memory 506, in one embodiment, implements the flow diagrams of the other figures. The system memory 506 can include computer system readable media in the form of volatile memory, such as random access memory (RAM) 510 and/or cache memory 512. Computer system/server 502 may further include other removable/non-removable, volatile/non-volatile computer system storage media. By way of example only, storage system 514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD- ROM, DVD-ROM or other optical media can be provided. In such instances, each can be connected to the bus by one or more data media interfaces. As will be further depicted and described below, memory 506 may include at least one program product having a set (e.g., at least one) of program modules that are configured to carry out the functions of various embodiments of the application.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 502 may also communicate with one or more external devices 520 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via I/O interfaces 524. Still yet, computer system/server 502 can communicate with one or more networks such as a local area network (LAN), a general wide area network (WAN), and/or a public network (e.g., the Internet) via network adapter 526. As depicted, network adapter 526 communicates with the other components of computer system/server 502 via a bus. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed.

Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   identifying a plurality of partitions associated with a blockchain;
   identifying a new transaction to be committed to the blockchain;
   determining a partition code assigned to the new transaction; and
   committing the new transaction to one of the plurality of partitions associated with the partition code;
   wherein the partition code is extracted from the new transaction via a partition switcher module;
   wherein the new transaction is forwarded to an assigned partition for commitment in the blockchain.

2. The method of claim 1, wherein the partition code assigned to the new transaction is identified based on a partition code script which defines a partition definition used to create the plurality of partitions.

3. The method of claim 2, further comprising:
   receiving the partition definition; and
   storing the partition definition in the blockchain.

4. The method of claim 2, further comprising:
   creating the plurality of partitions based on the partition definition.

5. The method of claim 4, further comprising:
   broadcasting the plurality of partitions to a plurality of peer nodes.

6. The method of claim 5, further comprising:
   receiving the new transaction at one or more of the plurality of peer nodes.

7. An apparatus, comprising:
   a hardware processor configured to:
      identify a plurality of partitions associated with a blockchain;
      identify a new transaction to be committed to the blockchain;
      determine a partition code assigned to the new transaction; and
   a transmitter configured to transmit the new transaction to one of the plurality of partitions associated with the partition code;
   wherein the partition code is extracted from the new transaction via a partition switcher module;
   wherein the new transaction is forwarded to an assigned partition for commitment in the blockchain.

8. The apparatus of claim 7, wherein the partition code assigned to the new transaction is identified based on a partition code script which defines a partition definition used to create the plurality of partitions.

9. The apparatus of claim 8, further comprising:
   a receiver configured to receive the partition definition; and
   a memory configured to store the partition definition in the blockchain.

10. The apparatus of claim 9, wherein the processor is further configured to:
    create the plurality of partitions based on the partition definition.

11. The apparatus of claim 10, wherein the transmitter is further configured to:
    broadcast the plurality of partitions to a plurality of peer nodes.

12. The apparatus of claim 11, wherein the receiver is further configured to:
    receive the new transaction at one or more of the plurality of peer nodes.

13. A non-transitory computer readable storage medium configured to store instructions that when executed cause a processor to perform:
    identifying a plurality of partitions associated with a blockchain;
    identifying a new transaction to be committed to the blockchain;
    determining a partition code assigned to the new transaction; and
    committing the new transaction to one of the plurality of partitions associated with the partition code;
    wherein the partition code is extracted from the new transaction via a partition switcher module;
    wherein the new transaction is forwarded to an assigned partition for commitment in the blockchain.

14. The non-transitory computer readable storage medium of claim 13, wherein the partition code assigned to the new transaction is identified based on a partition code script which defines a partition definition used to create the plurality of partitions.

15. The non-transitory computer readable storage medium of claim 14, wherein the processor is further configured to perform:
    receiving the partition definition; and
    storing the partition definition in the blockchain.

16. The non-transitory computer readable storage medium of claim 14, wherein the processor is further configured to perform:
    creating the plurality of partitions based on the partition definition.

17. The non-transitory computer readable storage medium of claim 16, wherein the processor is further configured to perform:
    broadcasting the plurality of partitions to a plurality of peer nodes.

18. The non-transitory computer readable storage medium of claim 13, wherein the processor is further configured to perform:
    receiving the new transaction at one or more of the plurality of peer nodes.

* * * * *